United States Patent [19]
Spracklen

[11] Patent Number: 5,960,012
[45] Date of Patent: Sep. 28, 1999

[54] CHECKSUM DETERMINATION USING PARALLEL COMPUTATIONS ON MULTIPLE PACKED DATA ELEMENTS

[75] Inventor: Lawrence A. Spracklen, Thomastown, United Kingdom

[73] Assignee: Sun Microsystems, Inc., Palo Alto, Calif.

[21] Appl. No.: 08/877,720

[22] Filed: Jun. 23, 1997

[51] Int. Cl.[6] .............................. G06F 11/10; H03M 13/00
[52] U.S. Cl. ........................................ 371/53; 364/736.01
[58] Field of Search .................. 371/53, 54; 364/736.01, 364/749, 788, 787.01, 787.02, 787.03, 787.04; 370/252

[56] References Cited

U.S. PATENT DOCUMENTS

| | | | |
|---|---|---|---|
| 5,327,369 | 7/1994 | Ashkenazi | 364/787 |
| 5,663,952 | 9/1997 | Gentry, Jr. | 370/252 |
| 5,751,618 | 5/1998 | Abiko et al. | 364/736.01 |

*Primary Examiner*—Phung M. Chung
*Attorney, Agent, or Firm*—Townsend and Townsend and Crew LLP

[57] ABSTRACT

A method for improved speed performance in calculating a checksum by loading groups of data elements into first and second registers. The loaded data elements are then added in parallel, with each data element being added to its corresponding data element in the other register. Thus, multiple additions can be done in parallel, with the result being added to a cumulative result and the process repeated.

9 Claims, 6 Drawing Sheets

CHECKSUM DETERMINATION USING PARALLEL COMPUTATIONS ON MULTIPLE PACKED DATA ELEMENTS

BACKGROUND OF THE INVENTION

The present invention relates to calculating checksums, and in particular to calculating a Fletcher checksum using a CPU with single instruction, multiple data (SIMD) capability.

When data are transmitted, corruption of this data can occur during transit. It is therefore necessary to utilize the appropriate safeguards. These usually take the form of a number of redundant check bits which can be generated by the sender, as some function of the associated data elements, and give the recipient a very good indication of whether the data have arrived intact. Appending the data to be transmitted with this "signature", and causing the recipient to generate its own version of the data signature, using exactly the same generation algorithm, allows the recipient to detect corrupted data (indicated by mismatched signatures). Error correction can then be achieved by requesting retransmission of the corrupted data packet. The two most common methods for performing this error detection are checksums or Cyclic Redundancy Checks (CRC).

While numerous variants of these two different methods exist, success can only be achieved if the participants in the data exchange agree to use the same error detection method. To this end, communication protocols exist to standardize, amongst other considerations, the error detection methods employed during data transmission. A variety of different communication protocols are widely used today, each exhibiting different desirable qualities. For instance, for TCP (Transmission Control Protocol) the domain for error detection is the entirety of the data packet, while for IP (Internet Protocol) only the headers are checked. (Generally, a header provides vital information about the destination address for the packet and is attached to the front of the data segment).

For the more rigorous protocols, error detection can be a time consuming process which limits the machine's throughput. It is for this reason that checksums are often utilized for error detection, while their error detection ability is generally inferior to that exhibited by CRCs, CRC checks, which are easier to implement in hardware, are not particularly suited for software implementation. Generally, computers exhibit a better performance with integer computations. This problem was addressed by J. G. Fletcher who developed the Fletcher Checksum as an alternative to CRCs (J. Fletcher, "An Arithmetic Checksum for Serial Transmissions", IEEE Transactions on Communications, vol. COM-30, p. 247, January 1982). The Fletcher checksum is an integer arithmetic checksum that exhibits a reasonable level of error detection, and lends itself to software implementation on non-dedicated processors.

Reducing the overhead of error detection increases transmission efficiency and allows higher data transmission rates. Experimentation suggests that throughput can be significantly affected by the implementation of the error detection algorithm utilized. On one occasion it was reported that the throughput tripled when the implementation of Fletcher's checksum utilized was changed from an unoptimized version to an optimized version, (A. Nakassis, "Fletcher's Error Detection Algorithm: How to implement it efficiently and avoid the most common pitfalls", ACM Comp. Commun. Rev., vol. 18, p. 63, October 1988). It is suggested here that, with protocols becoming increasingly streamlined and data rates constantly increasing, checksum performance can act as a performance bottleneck.

For communication over the Internet there are specified error detection parameters that constrain the error detection techniques utilized by the relevant protocols e.g. TCP, IP and UDP. One checksum implementation that satisfies the Internet error detection parameters is the Fletcher Checksum.

The Fletcher Checksum

Unlike CRCs, which involve the computation of polynomials, an arithmetic checksum is generally implemented as some form of linear function over the data to be transmitted. The arithmetic Fletcher checksum is generated by the following pair of iterative series:

$C(0)_1 = d(0)$; $C(1)_1 = C(0)_1$ $C(0)_2 = C(0)_1 + d(1)$; $C(1)_2 = C(1)_1 + C(0)_2$ $C(0)_N = C(0)_{N-1} + d(N-1)$; $C(1)_N = C(1)_{N-1} + C(0)_N$ where N is the number of data elements, d(X), in the packet.

A desirable property for a checksum to display is uniformly distributed checksum values. Unfortunately there is a tendency for the checksum results to display a normal distribution. However, using the lower bits of a larger checksum provides a value with a better distribution, (T. Kientzle, "The Working Programmer's Guide to Serial Protocols", Coriolis Group Books, 1995.) Consequently, if the data to be transmitted is a sequence of bytes, then the checksum results, or check bytes as they are often called, are appended as two octets to the data packet undergoing checksumming. Hence, computation of the Fletcher checksum is facilitated by:

$R(0) = (C(0)_N) \bmod 256$ $R(1) = (C(1)_N) \bmod 256$ checkresult=R(0)+(R(1))<8)

SUMMARY OF THE INVENTION

The present invention provides improved speed performance in calculating a checksum by loading or packing groups of data elements into first and second registers. The loaded data elements are then added in parallel, with each data element being added to its corresponding data element in the other register. Thus, multiple additions can be done in parallel, with the result being added to a cumulative result and the process repeated.

In the preferred embodiment, once all the additions have been done, the packed cumulative results are then themselves added together to produce the final value, the R(0) value of the Fletcher checksum. The R(1) value is generated similarly, except by multiplying a plurality of packed scale factors by the packed data elements first.

The present invention is preferably implemented using a microprocessor with an extended multi-media capability. In particular, a microprocessor having built-in capability for performing graphics operations requiring SIMD operations on multiple pixels is adapted to use the SIMD instructions to perform the checksum operation of the present invention.

For a further understanding of the nature and advantages of the invention, reference should be made to the following description taken in conjunction with the accompanying drawings.

DESCRIPTION OF THE PREFERRED EMBODIMENT

The present invention may be embodied in any microprocessor capable of SIMD execution. For example, the Intel MMX microprocessors could be used, or the Sun UltraSPARC with VIS (Visual Instruction Set). For the sake of example, an implementation using the Sun VIS will be described.

The UltraSPARC is a superscaler pipelined processor which is capable of providing a sustainable execution rate of four instructions per cycle even in the presence of cache misses and conditional branches. Of the four instructions than can be issued every cycle, combinations of up to two integer instructions and two floating point instructions are allowed. Instructions implementing floating point operations are processed by the Floating Point Unit (FPU) and the Graphics Unit. One of the features exhibited by the UltraSPARC, this of significant interest, is the enhancement of the floating point and graphics unit's (FGU) data paths to support partitioned integer arithmetic operations. To fully exploit these modifications to the floating point pipeline, the UltraSPARC processor, while being fully SPARC V9 compliant, also implements an additional set of instructions referred to as the VIS instruction set. This extension to the V9 instruction set is targeted at areas where traditional instructions perform poorly, in particular, graphics, and is proving to be an invaluable tool in boosting the performance of applications from an extremely wide variety of fields. The suite of instructions available in the VIS ensemble provide significant performance increases by the use of tailored instructions in the following areas:

Partitioned arithmetic, including the ability to calculate the absolute difference between the two sets of pixels.

Partitioned compare operations.

Data format conversions i.e. converting 16 or 32 bit fixed point data to pixel data and vice versa.

Bitwise logical operations on 64 or 32 bit data.

Handling for misaligned data.

Efficient access to data elements within three dimensional data structures.

Short loads and stores to and from the floating point registers.

The ability of the VIS instructions to introduce parallelism into data processing through the use of partitioned operations, coupled with the efficient data manipulation possible with VIS, is allowing software implementations of many applications that were previously considered as hardware specific due to the poor performance of traditional instructions in these often highly parallel tasks.

The features outlined in the previous paragraphs are intended to give a feel for the VIS instruction set. However, in the VIS implementation of the checksum, only a small subset of the array of instructions available are utilized. These instructions will now be considered in greater detail.

VIS provides the ability to introduce parallelism into addition operations. This is achieved by offering a variety of different instruction variants that perform partitioned addition or subtraction, for 16 or 32 bit data elements. For instance, the instruction vis_fpadd16 performs, in a single cycle, a four-way partitioned 16 bit addition offering a 4-fold speedup. There is no facility for detecting over or under flows.

Similarly to the addition options, several different versions of the VIS multiply are available. The entire collection of multiply instructions perform partitioned 8×16 multiplications. However, different versions of the instruction return results in different formats. For the majority of the multiplication instructions, the outcome is a series of 16 bit partitioned results, with rounding and truncation of the full 24 bit results being performed before storage.

One of the most attractive features of VIS is the ability to introduce parallelism through partitioned operations. However, many checksum algorithms tend to be represented as serial processes, i.e., one aspect of the computation is performed to completion before the next is started.

In their current state, the algorithms governing the generation of the checksum are linked i.e., in the process of checksum generation intermediate results from one series are required to calculate a value for the other series. This tended to frustrate using VIS instructions because it complicated attempts to parallelize, which is one of the most important aspects of VIS. Using VIS instructions is possible, since several data elements can be processed concurrently with the partitioned arithmetic instructions provided in VIS. However, it is necessary for the C(0) computation to complete before the dependent calculation can be started. This tends to reduce efficiency by reducing pipeline utilization, and causing the process to spend considerable amounts of time in wait states.

Therefore, a preferred approach to increase the performance of the VIS implementation is to eliminate this inter-algorithm dependency. For the algorithms governing the generation of the Fletcher checksum, this was achieved by representing C(1) as follows:

$$c(1)=C(0)_1+C(0)_2+ \ldots C(0)_N=(d(0))+(d(0)+d(1))+ \ldots (d(0)+ \ldots d(N+1))Nd(0)+(N-1)d(1)+ \ldots (1)d(N-1)$$

giving rise, in a more compact form, to:

$$R(0) = \left(\sum_{n=0}^{N-1} d(0)\right) \mod 256$$

$$R(1) = \left(\sum_{n=0}^{N-1} ((N-n) \times d(n))\right) \mod 256$$

With this adaptation of the format of the generating algorithm, it is possible to create each of the checksum sub-sections solely from the transmission data, i.e., independently of each other. While this step changed the algorithm into a format that facilitated easy VIS coding, it was still necessary to determine the best approach for creating the VIS routine.

For any data stream, to facilitate the generation of the checksum, it is necessary to:

Perform a summation over all of the data elements in the data packet (generating C(0)).

Perform a summation over all of the data elements, with each element being first multiplied by a variable scale factor (generating C(1)).

Overall CPU Architecture

Figure 1:
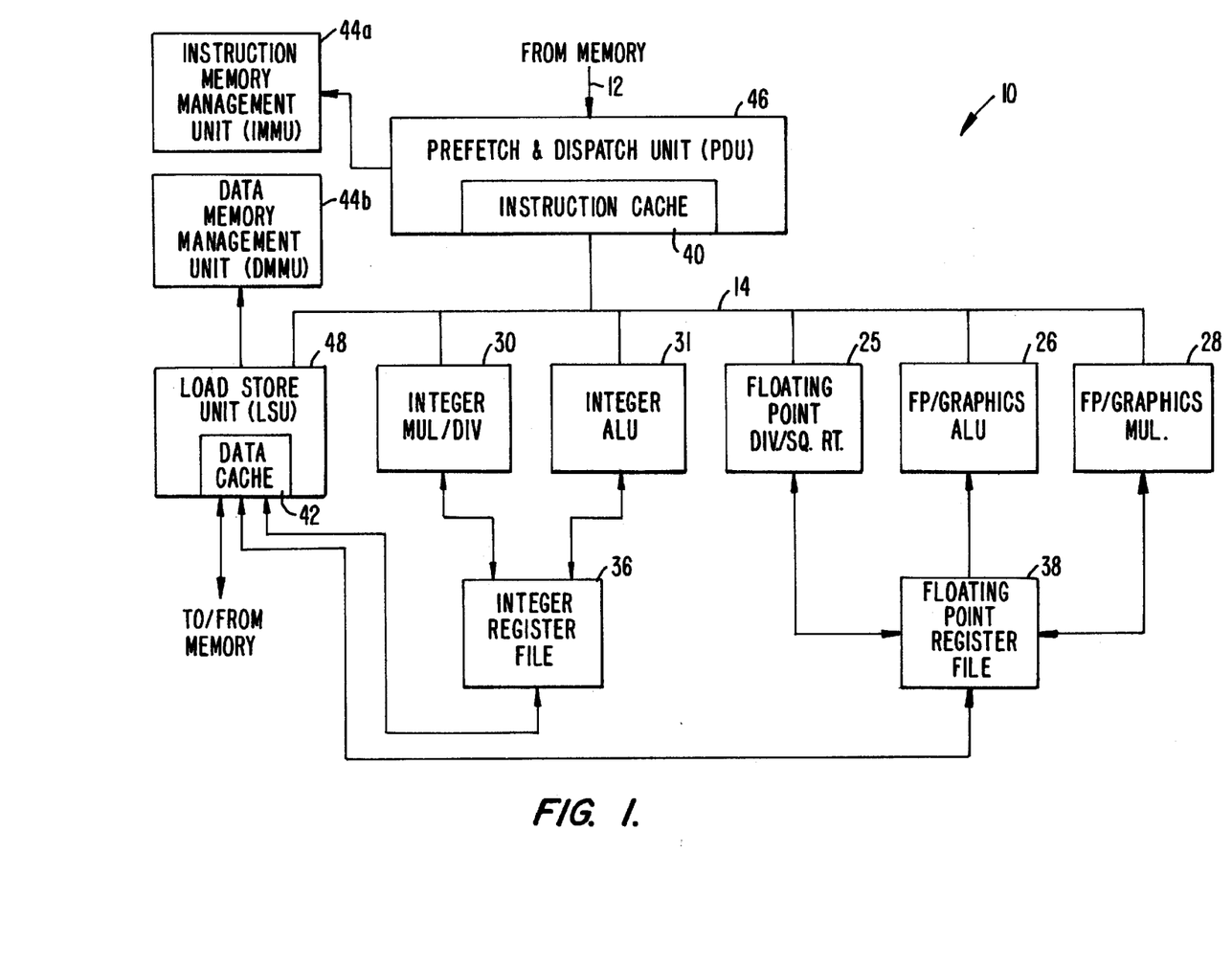
FIG. 1 is a block diagram of one embodiment of the functional units of a microprocessor incorporating the present invention.

Referring now to FIG. 1, a block diagram illustrating the CPU of an exemplary graphics computer system incorporating the teachings of the present invention is shown.

As illustrated, a CPU 10 includes a prefetch and dispatch unit (PDU) 46 connected to an instruction cache 40. Instructions are fetched by this unit from either the cache or main memory on a bus 12 with the help of an instruction memory management unit (IMMU) 44a. Data is fetched either from main memory or from a data cache 42 using a load storage unit (LSU) 48 working with a data memory management unit (DMMU) 44b.

PDU 46 issues up to four instructions in parallel to multiple pipelined execution units along a pipeline bus 14. Integer operations are sent to one of two integer execution units (IEU), an integer multiply or divide unit 30 and an integer ALU 31. These two units share access to an integer register file 36 for storing operands and results of integer operations.

Separately, three floating point operation units are included. A floating point divide and square root execution unit 25, a floating point/graphics ALU 26 and a floating point/graphics multiplier 28 are coupled to pipeline bus 14 and share a floating point register file 38. The floating point register file stores the operands and results of floating point and graphics operations.

A floating point adder and floating point multiplier include graphics capability. The graphics capability added to the floating point path allows integer operations to be issued at the same time along pipeline bus 14, thus processing in parallel.

The data path through the floating point units 26 and 28 has been extended to 64 bits in order to be able to accommodate 8—8 bit pixel representations, (or 4–16 bit, or 2–32 bit representations) in parallel. Thus, the standard floating point path of 53 bits plus 3 extra bits (guard, round and sticky or GRS) has been expanded to accommodate the graphics instructions.

Additionally, the IEU also performs a number of graphics operations, and appends address space identifiers (ASI) to the addresses of load/store instructions for the LSU 48, identifying the address spaces being accessed. LSU 48 generates addresses for all load and store operations. LSU 48 also supports a number of load and store operations, specifically designed for graphics data. Memory references are made in virtual addresses. The MMUs 44a–44b include translation look-aside buffers (TLBs) to map virtual addresses to physical addresses.

FP/Graphics ALU 26

Figure 2:
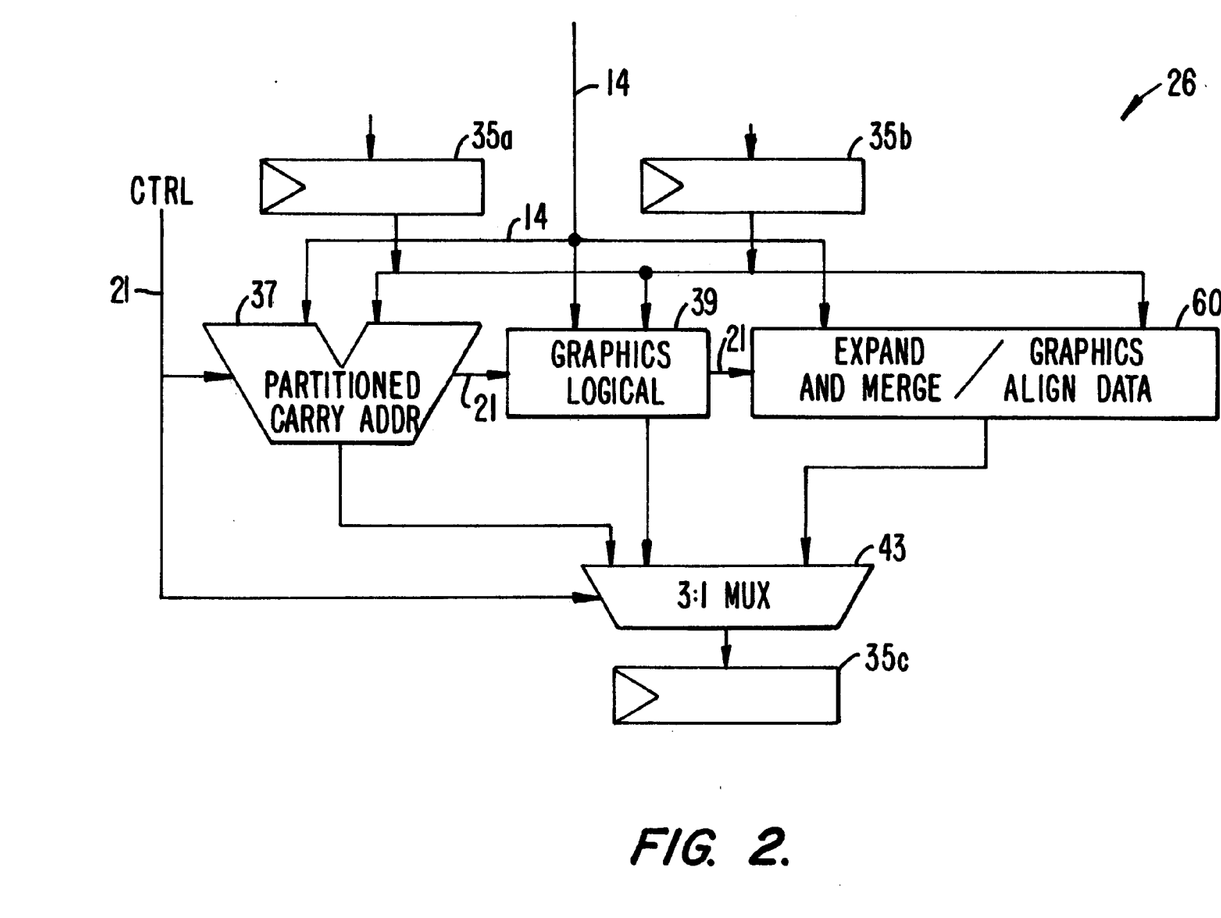
FIG. 2 is a block diagram of a first graphics ALU functional unit of FIG. 1.

Referring now to FIG. 2, a block diagram illustrating the relevant portions of one embodiment of the first partitioned execution path in unit 26 is shown.

Pipeline bus 14 provides the decoded instructions from PDU 46 to one of three functional circuits. The first two functional units, partitioned carry adder 37 and graphics logical circuit 39, contain the hardware typically contained in a floating point adder and an integer logic unit. The circuitry has been modified to support graphics operations. An additional circuit 60 has been added to support both graphics expand and merge operations and graphics data alignment operations. Control signals on lines 21 select which circuitry will receive the decoded instruction, and also select which output will be provided through a multiplexer 43 to a destination register 35c. Destination register 35c, and operand register 35a and 35b are illustrations of particular registers in the floating point register file 38 of FIG. 1.

At each dispatch, the PDU 46 may dispatch either a graphics data partitioned add/subtract instruction, a graphics data alignment instruction, a graphics data expand/merge instruction or a graphics data logical operation to unit 26. The partitioned carry adder 37 executes the partitioned graphics data add/subtract instructions, and the expand and merge/graphics data alignment circuit 60 executes the graphics data alignment instruction using the alignaddr_ offset stored in a global status register. The graphics data expand and merge/graphics data alignment circuit 60 also executes the graphics data merge/expand instructions. The graphics data logical operation circuit 39 executes the graphics data logical operations.

The functions and constitutions of the partitioned carry adder 37 are similar to simple carry adders found in many integer execution units known in the art, except the hardware are replicated multiple times to allow multiple additions/subtractions to be performed simultaneously on different partitioned portions of the operands. Additionally, the carry chain can be optionally broken into smaller chains.

The functions and constitutions of the graphics data logical operation circuit 39 are similar to logical operation circuits found in many integer execution units known in the art, except the hardware are replicated multiple times to allow multiple logical operations to be performed simultaneously on different partitioned portions of the operands. Thus, the graphics data logical operation circuit 39 will also not be further described.

FP/Graphics Multiply Unit 28

Figure 3:
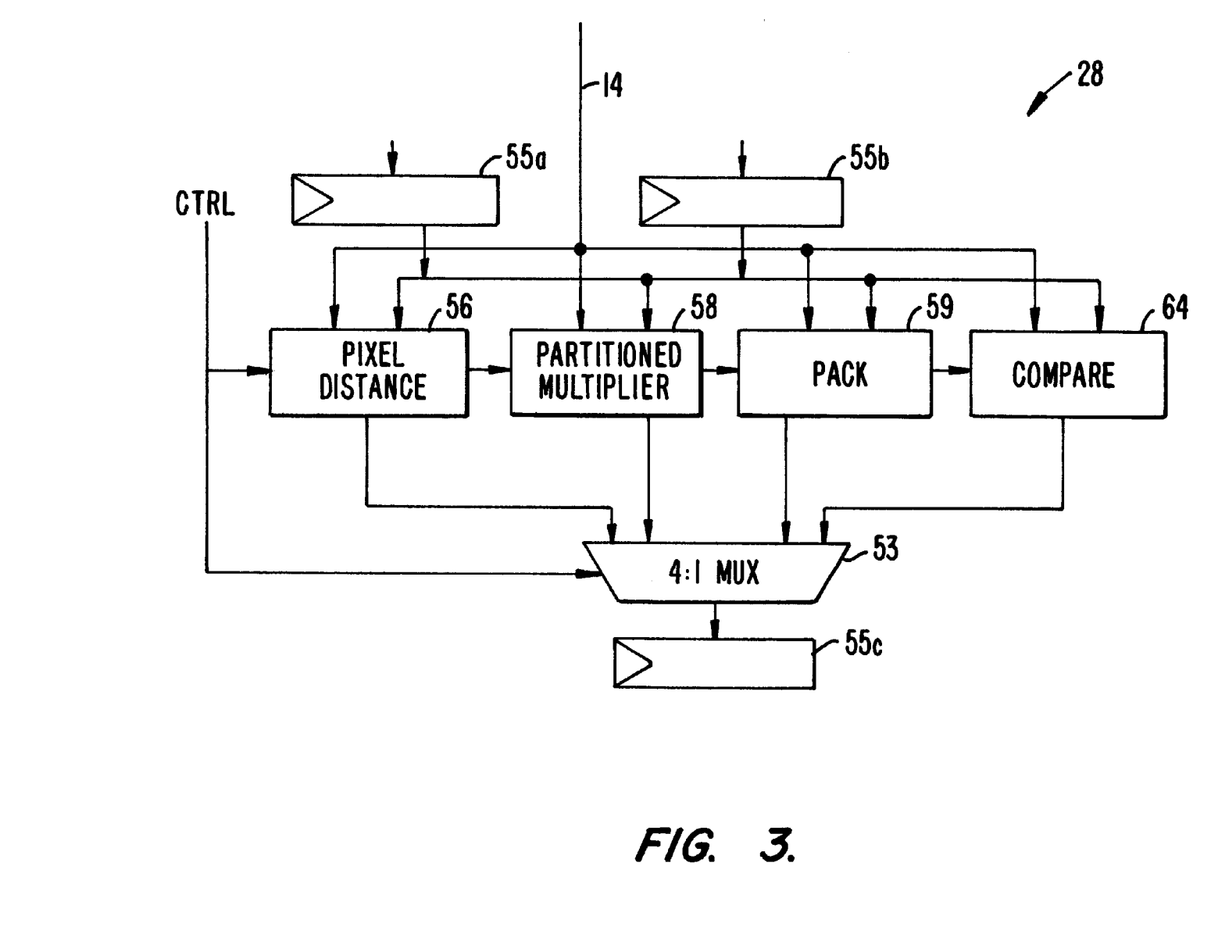
FIG. 3 is a block diagram of a second graphics multiply unit of FIG. 1.

Referring now to FIG. 3, a block diagram illustrating the relevant portion of one embodiment of the FP/graphics multiply unit 28 in further detail is shown. In this embodiment, multiply unit 28 comprises a pixel distance computation circuit 56, a partitioned multiplier 58, a graphics data packing circuit 59, and a graphics data compare circuit 64, coupled to each other as shown. Additionally, a number of registers 55a–55c (in floating point register file 38) and a 4:1 multiplexer 53 are coupled to each other and the previously-described elements as shown. At each dispatch, the PDU 46 may dispatch either a pixel distance computation instruction, a graphics data partitioned multiplication instruction, a graphics data packing instruction, or a graphics data compare instruction to unit 28. The pixel distance computation circuit 56 executes the pixel distance computation instruction. The partitioned multiplier 58 executes the graphics data partitioned multiplication instructions. The graphics data packing circuit 59 executes the graphics data packing instructions. The graphics data compare circuit 64 executes the graphics data compare instructions.

The functions and constitutions of the partitioned multiplier 58, and the graphics data compare circuit 64 are similar to simple multipliers and compare circuits found in many integer execution units known in the art, except the hardware are replicated multiple times to allow multiple multiplications and comparison operations to be performed simultaneously on different partitioned portions of the operands. Additionally, multiple multiplexers are provided to the partitioned multiplier for rounding, and comparison masks are generated by the comparison circuit 64.

Fletcher Checksum Calculation.

Figure 4:
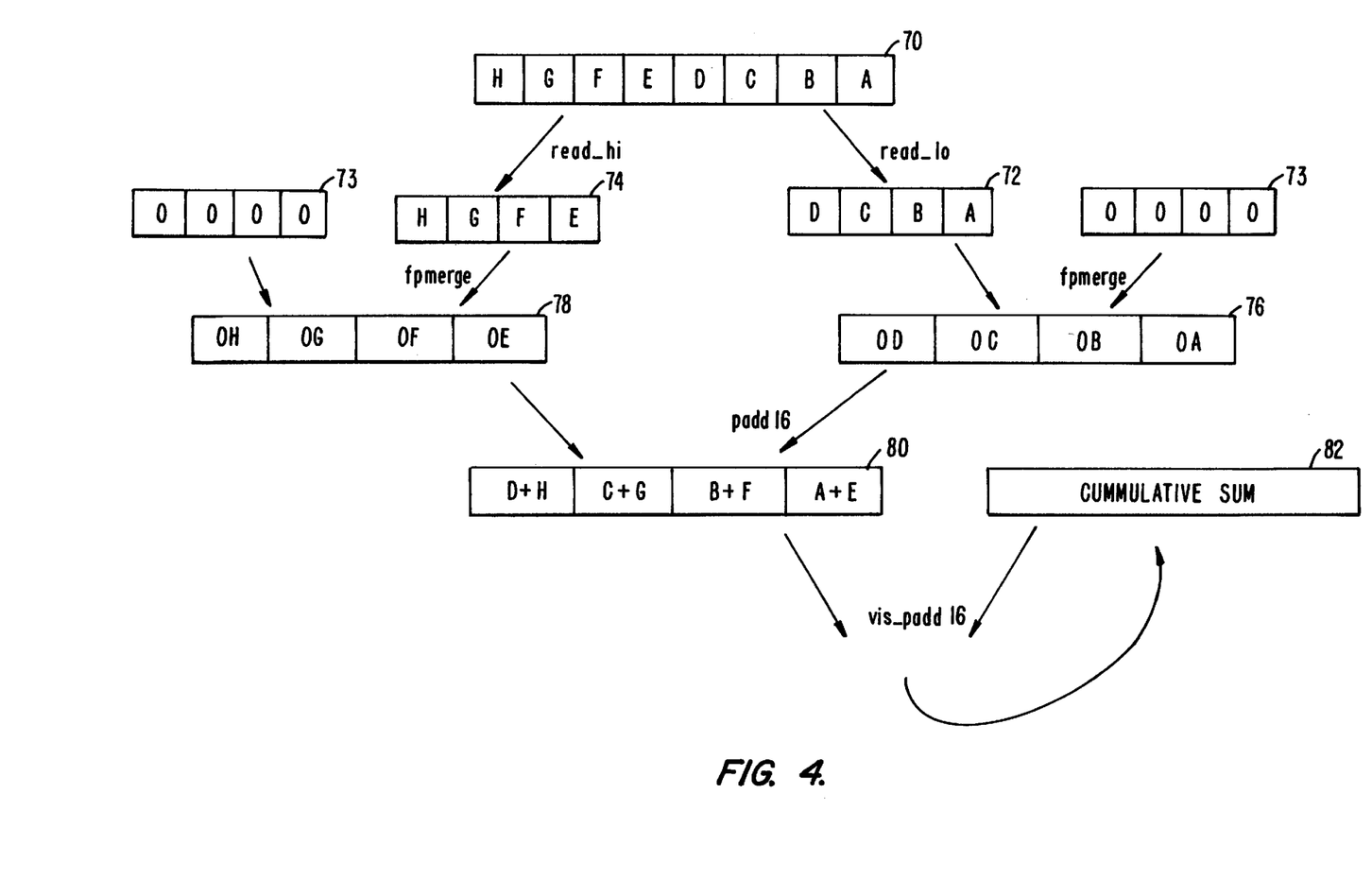
FIG. 4 is a diagram illustrating the calculation of the R(0) element of a Fletcher checksum according to one embodiment of the present invention.

FIG. 4 illustrates the calculation of the C(0) or R(0) term of the Fletcher checksum. 64 bits of data are loaded into a register in the register file. This could be done as part of a VIS block load in which multiple registers are loaded using one instruction, further reducing the number of operations needed. An example register 70 is shown, having eight data elements labelled A–H. Please note that the register designations of the figures are illustrative only, and the same register could be written over in actual operation. Each of data elements A–H is 8 bits or a byte. The VIS instruction set only includes adds for 16 bit or 32 bit data elements. Accordingly, a vis_read_lo operation is executed to load the lower 32 bits of register 70 into a 32 bit portion of a register 72. Similarly, a vis_read_hi operation is performed to load elements E–H into a register 74.

Since these elements are now located in the lower half of the register and are 8 bits each, they would be treated as two 16 bit quantities. In order to separate the elements, a vis_fpmerge instruction is executed on each of registers 72 and 74, merging them with zeroed register 73. This will load them into partitioned portions of registers 76 and 78 with a byte of leading zeros appended to each.

The contents of the two registers 76 and 78 are then added together using the instruction vis_padd16. This adds the partitioned, 16 bit quantities together to produce the result shown in the register 80. For example, first data element A has been added with element E, and stored as a 16 bit quantity. Either an initial value of zero, or a previous cummulative sum is stored in the register 82. This is added to the contents of register 80, and stored back in the sum register 82. The process is then iterated again for the next register of data until all the data elements of a data packet are processed. To get the final R(0) value, the four partitioned data sum elements in register 82 are then added to each other using appropriate instructions to separate out each 16 bit quantity and then add them together to produce the final sum.

In addition to the steps set forth in FIG. 4, to compute the R(1) term, a multiply by a scale factor must also be done. This process is illustrated in FIG. 5.

Figure 5:
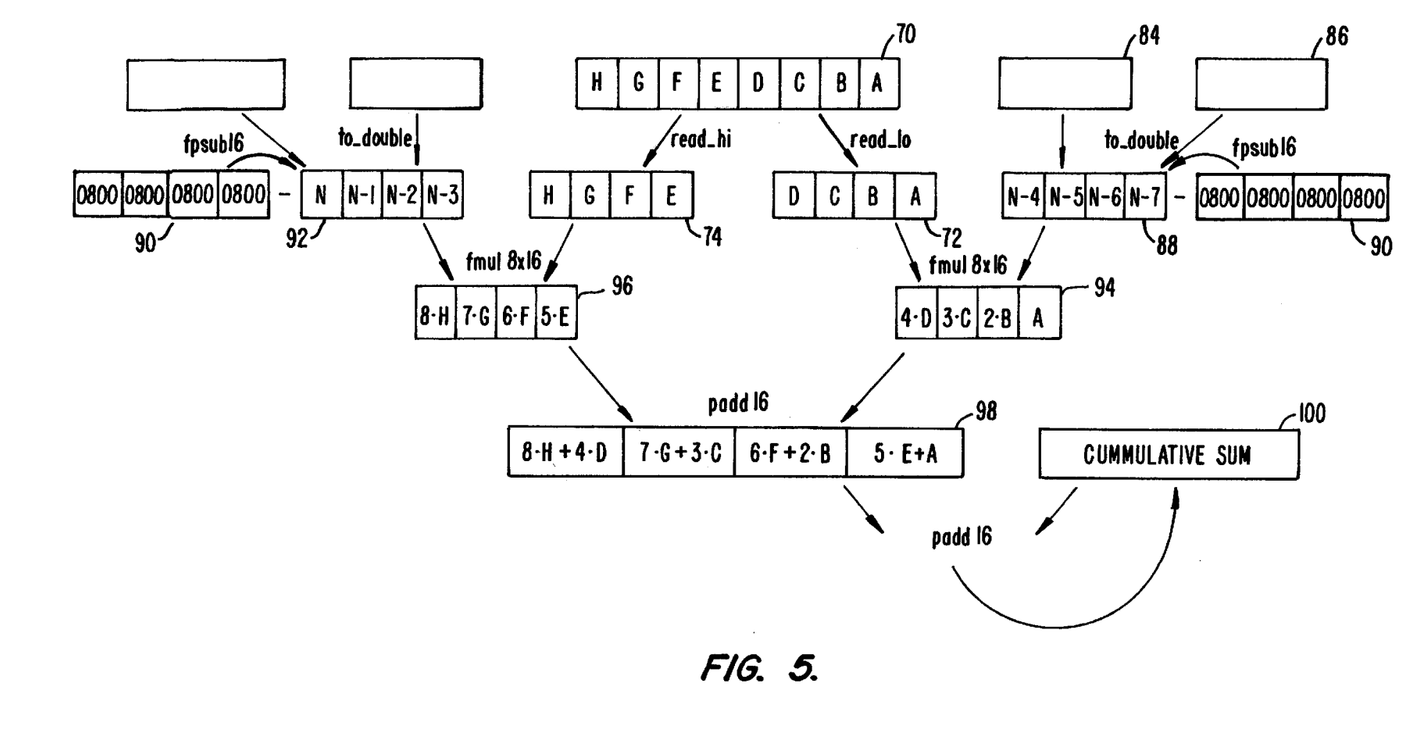
FIG. 5 is a diagram illustrating the calculation of the R(1) element of the Fletcher checksum in accordance with one embodiment of the invention.

FIG. 5 illustrates the operations needed for the second element, R(1), of the Fletcher checksum. Steps which duplicate those of FIG. 4 are illustrated again for ease of understanding, although the data can be shared in actual operation. A register 70 is loaded with a 64 bit value of 8 bytes, as before. This is additionally broken into 32 bit portions in separate registers 72 and 74 with the read_lo and read_hi instructions, as discussed above. The VIS multiplication instruction available will multiply, in parallel, four partitioned 8 bit quantities by four partitioned 16 bit quantities. The end result is a 64 bit variable containing partitioned results from the multiplication, with 16 bits for each partitioned result. As can be seen, an 8×16 bit multiplication will result in 24 bits. Accordingly, the lower 8 bits of the result are truncated by this instruction. Unfortunately, for the checksum calculation, it is the lower bits of the calculation which are important and, therefore, this truncation would defeat the purpose of the checksum.

The present invention overcomes this by causing the upper bits to be truncated instead. This is done by shifting the scale factor so that the lower 8 bits are all zeros. This is then used as the 16 bit value for the multiplication. Thus, the truncation will result in the desired portion with the least significant bits being maintained.

To use the scale factor in 16 bit fields and do four partitioned multiplies at once, the scale factors must be loaded into four partitioned portions of a 64 bit register. Since typically numbers are generated using a 32 bit field, two 32 bit quantities are combined in a register, with each 32 bit quantity being configured as two shifted scale factors. This combining is done with a VIS instruction entitled vis_to_double, as shown in FIG. 5 for loading two values 84 and 86 into a 64 bit register 88.

The scale factor is related to the position of the data elements within the data packet being checksumed. For example, the first data element is scaled by N, the second data element is scaled by N−1, the third data element is scaled by N−2, etc., where N is the number of data elements in the packet. After each pass through a 64-bit quantity, with eight data elements, each partitioned scale factor must be decreased by 8. Accordingly, a register 90 stores a constant which provides 4 partitioned values of 8, shifted appropriately, i.e., each 8 occupies the upper byte of each 16-bit partitioned valued, which is subtracted from the contents of register 88 after each pass through a set of 8 elements in the data packet.

The two separate scale factor vairables, one for the four high end bytes, and one for the four low end bytes, of the data originally in register 70, are a shifted representation of the low 8-bits of the length of the data packet, scaled appropriately for their current associated data element's position in the data packet.

The scale factor in register 88 is then multiplied by the contents of register 72, with the result, as truncated, being provided to a register 94. Similarly, the high end 4 bytes from register 74 are multiplied by scale factor 92 and placed in a register 96.

The contents of these two registers 94 and 96 are then added together with a VIS partitioned add instruction, vis_padd16, and stored in a register 98. This is then summed with a cumulative sum from a register 100, and stored back in register 100. Similarly to FIG. 4, after the completion of all the elements in the data packet, the four partial sums in register 100 are added together to produce the final result. This can be done by using instructions which separate out the different partitioned values, and then adding the values together.

Figure 6:
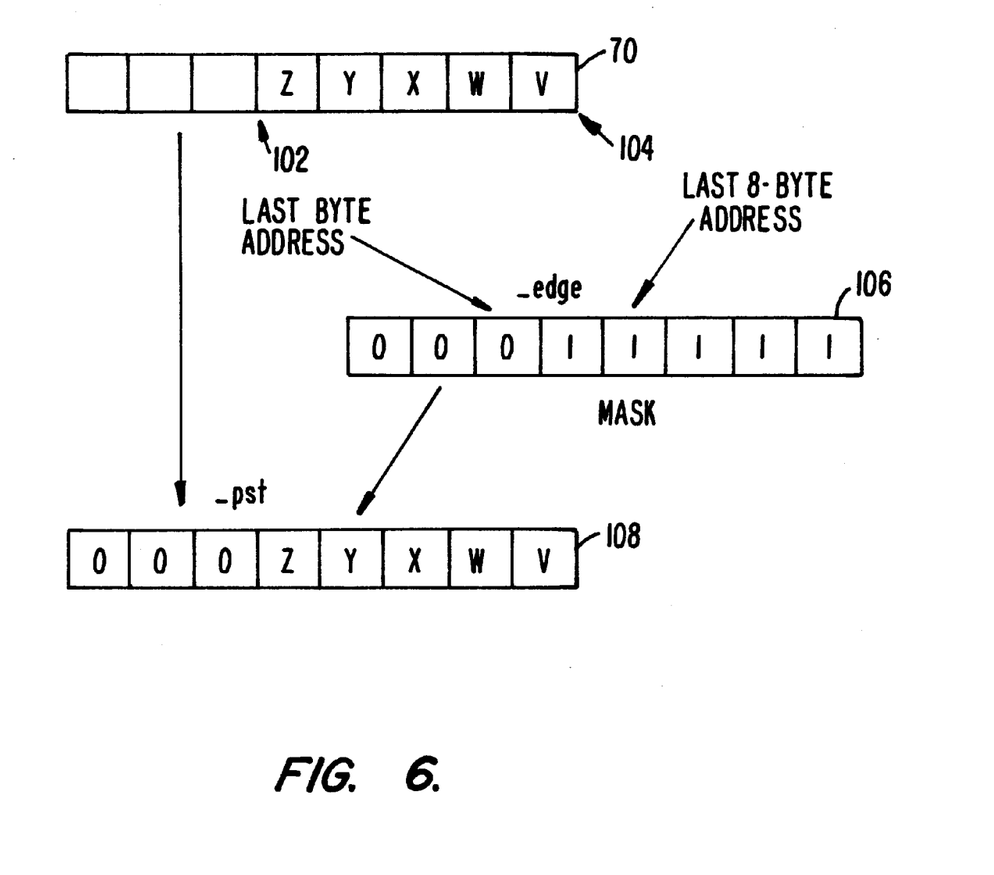
FIG. 6 is a diagram illustrating the handling of a data packet which is not an exact multiple of the register size of the CPU.

One implementation complication that arises is that the data packet may not be an even multiple of 8 bytes. Accordingly, a last set of data elements may not completely fill register 70. This is illustrated in FIG. 6 where a last byte in register 70 might only have elements up to a location 102, shown as 5 bytes in the example of FIG. 6. By using the address of the byte at location 102, and the address of the byte 104 at the beginning of this last group of bytes, VIS instructions for padding data packets out to a useable length can be taken advantage of. These instructions will zero out the unused byte positions, which for a checksum calculation will effectively eliminate their effect on the result, even though they are added in. Adding in and multiplying by zero does not contribute to the checksum result, and accordingly the desired result is achieved.

As illustrated in FIG. 6, by supplying the two addresses 102 and 104 to a vis_edge instruction, a mask is generated as illustrated in register 106. In the example shown, the mask will have 1 bits at the five byte positions desired to be used, and zeros at the others. Next, the vis_pst instruction, which uses the generated mask, can be used to pad out the packet, with zeros, to a multiple of 8 bytes. The final part of the data packet can then be loaded into register 108.

As can be seen from the above description and FIGS. 4 and 5, the calculation of the two portions R(0) and R(1) of the Fletcher checksum could be done either simultaneously or sequentially. It has been determined that for the VIS instructions on the UltraSPARC processor, data movement was the most time-consuming operation. Consequently, it is advantageous to perform both series of operations simultaneously to the extent possible, using the data already loaded for both sets where possible to limit data movement time.

The performance of the present invention was determined by comparing to a standard implementation written in C.

Computations were performed on a 167 MHz UltraSPARC, with the results being generated by averaging performance results over 100,000 checksum calculations. For all packet lengths, the present invention was found to compute the required checksum almost six times faster than the standard implementation. In addition, there was no noticeable degradation in performance when the data packets with irregular lengths (not multiples of 8 bytes) were handled.

The following is a short description of the VIS instructions used by the present invention. A more complete description may be found in the Visual Instruction Set User Guide available from Sun Microsystems, Inc.

1. vis_read_hi( ), vis_read_lo( )
    Function
        Read the upper or lower component of a vis_d64 variable.
    Description
        vis_read_hi( ) and vis_read_lo( ) permit read operations to the upper uppercomp or lower lowercomp 32 bit components of a vis_d64 variable.

2. vis_to_double( ), vis_to_double_dup( )
    Function
        Place two vis_u32 values into a vis_d64 variable.
    Description
        vis_to_double( ) places two vis_u32 variables data1_32 and data2_32 in the upper and lower halves of a vis_d64 variable. The vis_to_double_dup( ) places the same vis_u32 variable data_32 in the upper and lower halves of a vis_d64 variable.

3. vis_fpadd[16, 16s, 32, 32s]( ), vis_fpsub[16, 16s, 32, 32s]( )
    Function
        Perform addition and subtraction on two 16 bit, four 16 bit or two 32 bit partitioned data.
    Description
        vis_fpadd16( ) and vis_fpsub16( ) perform partitioned addition and substraction between two 64 bit partitioned variables, interpreted as four 16 bit signed components, data1_4_16 and data2_4_16 and return a 64-bit partitioned variable interpreted as four 16 bit signed components, sum_4_16 or difference_4_16. vis_fpadd32( ) and vis_fpsub32( ) perform partitioned addition and subtraction between two 64 bit partitioned components, interpreted as two 32 bit signed variables, data1_2_32 and data2_2_32 and return a 64 bit partitioned variable interpreted as two 32 bit components, sum_2_32 or difference_2_32. Overflow and underflow are not detected and result in wraparound. The 32 bit versions interpret their arguments as two 16 bit signed values or one 32 bit signed value.

The single precision version of these instructions vis_fpadd16s( ), vis_fpsub16s( ), vis_fpadd32s( ), vis_fpsub32s( ) perform two 16-bit or one 32-bit partitioned adds or subtracts.

4. vis_fmul8×16( )
    Function
        Multiply the elements of an 8 bit partitioned vis_f32 variable by the corresponding element of a 16 bit partitioned vis_d64 variable to produce a 16 bit partitioned vis_d64 result.
    Description
        vis_fmul8×16( ) multiplies each unsigned 8-bit component within pixels by the corresponding signed 16-bit fixed-point component within scale and returns the upper 16 bits of the 24 bit product (after rounding) as a signed 16-bit component in the 64 bit returned value. Or in other words:
        16 bit result=(8 bit pixel element* 16 bit scale element+128)/256

This instruction treats the pixels values as fixed-point with the binary point to the left of the most significant bit. For example, this operation is used with filter coefficients as the fixed-point scale value, and image data as the pixels value.

5. vis_fpmerge( )
    Function
        Merges two 8 bit partitioned vis_u32 arguments by selecting bytes from each in an alternating fashion.
    Description
        vis_fpmerge( ) interleaves four corresponding 8 bit unsigned values within pixels1 and pixels2 to produce a 64 bit merged result.

6. vis_edge[8, 16, 32]( )
    Function
        Compute a mask used for partial storage at an arbitrarily aligned start or stop address. Instructions are typically used to handle boundary conditions for parallel pixel scan line loops.
    Description
        vis_edge8( ), vis_edge16( ) and vis_edge32( ) compute a mask to identify which (8, 16 or 32 bit) components of a vis_d64 variable are valid for writing to a 8 byte aligned address. vis_edge[8, 16, 32]( ) are typically used with a partial store instruction. Partial stores always start to write at an 8 byte aligned address; an application, on the other hand, may want to start writing at an arbitrary address that is not 8 byte aligned. This necessitates a mask. E.g., if you want to start writing data at address 0x10003, the partial store, using a partial store instruction as described in the next section, will start writing at address 0x10000 and the mask [00011111] will disable the writes to 0x10000, 0x10001 and 0x10002 and enable writes to 0x10003, 0x10004, 0x10004, 0x10006 and 0x10007.

vis_edge[8, 16, 32]( ) accept 2 addresses, address1 and address2 where address1 is the address of the next pixel to write and address2 is the address of the last pixel in the scanline. These instructions compute two masks, a left edge mask based on address1 and a right edge mask based on address2. They then zero out the three least significant bits of address1 and address2 to get 8-byte aligned addresses, i.e. address1 & (~7), address2 & (~7). If the aligned addresses differ, then the left edge mask is returned; if they are the same, the result of the bitwise ANDing of the left and right edge masks is returned. Note that if the aligned addresses differ and address is greater than address2, the edge instructions still return the left edge mask, which in almost all cases is not what you want. So, when the aligned addresses differ, it is best to keep address less than or equal to address2.

The little ending versions vis_edge[8l, 16l, 32l( ) compute a mask that is bit reversed from the big ending version.

7. vis_pst_[8, 16, 32]( )

Function

Write mask enabled 8, 16 and 32 bit components from a vis_d64 value to memory.

Description vis_pst_[8, 16, 32]( ) use mask, typically determined by edge or compare instructions to control which 8, 16, or 32 bit components of data are to be written to memory. Typical uses include writing only selected channels of a multi-channel image, avoiding writing past image boundaries, and selecting between images on a pixel-by-pixel basis based on the result of a comparison instruction.

As will be understood by those of skill in the art, the present invention may be embodied in other specific forms without departing from the spirit or essential characteristics thereof. For example, other checksums than a Fletcher checksum could be handled using the partitioned addition and multiplication technique of the present invention. Accordingly, the foregoing description is intended to be illustrative, but not limiting, of the scope of the invention which is set forth in the appended claims.

What is claimed is:

1. A method for calculating a checksum on a data packet having a plurality of data elements, using a processor with single instruction multiple data (SIMD) capability, comprising the steps of:

(a) loading a first group of data elements into a first register;

(b) loading a second group of data elements into a second register;

(c) performing multiple additions in parallel of said data elements in said first and second groups to produce a first result;

(d) performing multiple additions in parallel of said first result with a cumulative result; and (e) repeating steps (a)–(d) for all of said data elements in said packet.

2. The method of claim 1 further comprising the steps of:

(f) loading a plurality of scale factors into a third register; and (g) performing multiple multiplications in parallel of said scale factors and said first group of data.

3. The method of claim 2 further comprising the step of:

(h) repetitively decrementing said scale factors for application to a next group of data elements.

4. The method of claim 2 further comprising the steps of:

shifting said scale factors by a first amount of bits;

truncating a result of said multiplications by said first amount of bits.

5. The method of claim 1 further comprising the step of:

adding together the elements of said cumulative result.

6. A method for calculating a checksum on a data packet having a plurality of data elements, using a processor with single instruction multiple data (SIMD) capability, comprising the steps of:

(a) loading a first group of data elements into a first register;

(b) loading a second group of data elements into a second register;

(c) performing multiple additions in parallel of said data elements in said first and second groups to produce a first result;

(d) performing multiple additions in parallel of said first result with a cumulative result;

(e) repeating steps (a)–(d) for all of said data elements in said packet;

(f) loading a plurality of scale factors into a third register;

(g) performing multiple multiplications in parallel of said scale factors and said first group of data; and (h) repetitively decrementing said scale factors for application to a next group of data elements.

7. The method of claim 6 further comprising the steps of:

shifting said scale factors by a first amount of bits;

truncating a result of said multiplications by said first amount of bits.

8. The method of claim 6 further comprising the step of:

adding together the elements of said cumulative result.

9. A computer program product comprising:

a computer usable medium having computer readable code embodied therein for causing the calculating of a checksum on a data packet having a plurality of data elements, using a processor with single instruction multiple data (SIMD) capability, the computer code comprising instructions for (a) loading a first group of data elements into a first register;

(b) loading a second group of data elements into a second register;

(c) performing multiple additions in parallel of said data elements in said first and second groups to produce a first result;

(d) performing multiple additions in parallel of said first result with a cumulative result; and (e) repeating steps (a)–(d) for all of said data elements in said packet.

* * * * *